G. DE BRANDNER.
FILTER.
APPLICATION FILED MAY 16, 1911.
1,028,535.
Patented June 4, 1912.
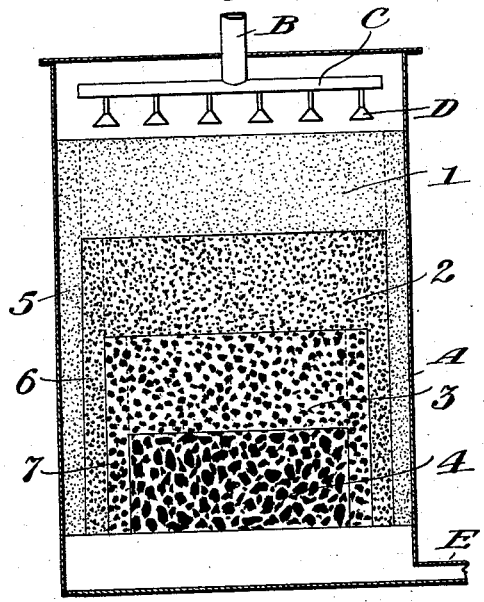
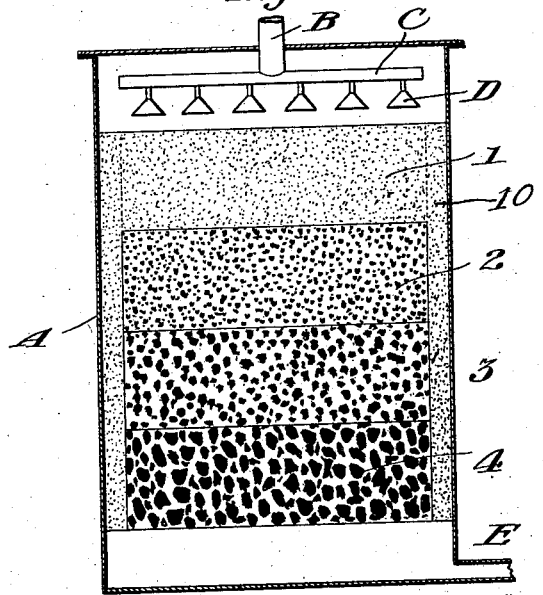
Witnesses:
Eugene Wening
Clarissa Frank K.
Inventor
Georges de Brandner
by
his Attorney

UNITED STATES PATENT OFFICE.

GEORGES DE BRANDNER, OF BRUSSELS, BELGIUM.

FILTER.

1,028,535.

Specification of Letters Patent.

Patented June 4, 1912.

Application filed May 16, 1911. Serial No. 627,385.

*To all whom it may concern:*

Be it known that I, GEORGES DE BRANDNER, a subject of the King of Belgium, residing at 33 Rue du Chatelain, Brussels, Belgium, have invented certain new and useful Improvements in Filters, of which the following is a specification.

The present invention relates to an improved form of filter employing pulverulent filtering media arranged in layers or strata, the material of the several layers being of different degrees of fineness.

It is the primary object of my invention to provide a filter by means of which all fluids passing therethrough, notably water, will be thoroughly filtered and have all impurities eliminated therefrom.

In the accompanying drawing wherein the preferred embodiment of my invention is illustrated, Figure 1 is a vertical sectional view through a filter embodying my invention; and Fig. 2 is a similar view of a modified form thereof.

In carrying my invention into effect, I provide a suitable casing A into the top of which leads the pipe B connected to the transverse pipes C having the nozzles D through which the water to be filtered issues. Arranged within the casing A is a series of layers or strata of filtering media, such as sand, these layers being designated 1, 2, 3, and 4, and it will be noted that the first layer 1 is composed of pulverulent material which is very fine, while the material of the subsequent layers increases in coarseness in progressive order, that is to say, layer 2 is less fine than layer 1, layer 3 is less fine than layer 2 and layer 4 is the coarsest of all. By this construction, the layer 1 receives and holds practically all the solid organic and inorganic matter in the water to be filtered and the subsequent layers serve to eliminate from the water any remaining impurities which were not retained by the filtering media of layer 1.

In filters of the characters herein referred to, it has been found that water passing downwardly through the filter between the casing wall and the outer periphery of the filtering media, is not freed from its impurities and passes out of the filter at the outlet E in practically its original state. I propose to overcome this defect by providing the filter with means arranged peripherally and designed to deflect all entering water having a tendency to work toward the walls of the filter, in the direction of the center of the filtering body, and the means best adapted to this purpose consists of one or more peripheral layers of pulverulent filtering media. In Fig. 2 one such peripheral layer is shown and designated 10. The layer 10 is composed of material of practically uniform fineness and extends up as high as the upper filtering layer or stratum 1. In Fig. 1 wherein the preferred form is shown, I provide more effective means for deflecting entering water toward the center of the filter, such means consisting of a plurality of peripheral layers of pulverulent material, numbered respectively, 5, 6 and 7, the material of these layers being of different degrees of fineness, that is to say, the grains of layer 5 being the finest of the three layers, the grains of layer 6 being somewhat coarser and the grains of layer 7 being the coarsest of the three.

Having thus described my invention, what I claim as new and desire to secure by Letters Patent is:—

1. A filter comprising a casing having therein a plurality of layers or strata of pulverulent material, the fineness of the material of said layers progressively decreasing in the direction in which the water passes through the filter, and peripheral layers of finer pulverulent material for deflecting entering water toward the center of the filtering body.

2. A filter comprising a casing having therein a plurality of layers or strata of pulverulent material, the fineness of the material of said layers decreasing progressively in the direction in which the water passes through the filter, and peripheral layers of pulverulent filtering material the fineness of which decreases from the periphery toward the center of the filter.

In testimony whereof I have affixed my signature in presence of two witnesses.

GEORGES DE BRANDNER.

Witnesses:
G. ROOSEVELT PHELAN,
EMILE VAN WANSELL.

Copies of this patent may be obtained for five cents each, by addressing the "Commissioner of Patents, Washington, D. C."